Sept. 1, 1953     F. BUSEMANN     2,651,017
PROTECTIVE APPARATUS FOR DIRECT CURRENT TRANSMISSION LINES
Filed March 14, 1952     2 Sheets-Sheet 1

Inventor
Felix Busemann
By Ralph B. Stewart
Attorney

UNITED STATES PATENT OFFICE 2,651,017

PROTECTIVE APPARATUS FOR DIRECT CURRENT TRANSMISSION LINES

Felix Busemann, Greenford, England, assignor, by mesne assignments, to E. R. A. Patents Limited, Leatherhead, England, a body corporate of Great Britain Application March 14, 1952, Serial No. 276,506
In Great Britain March 22, 1951

2 Claims. (Cl. 321—14)

This invention relates to high voltage direct current electric power transmission systems of the type in which valve converters connected in double path bridge arrangement serve to rectify alternating current from a mains supply transformer so as to provide direct current for the transmission line, and further valve converters connected in a corresponding manner at the far end of the line serve to invert the direct current and provide alternating current at the desired point. The invention is particularly concerned with the protection of such a transmission system.

In such systems, power is transmitted over the direct current line at voltages of the order of 100,000 volts with power of the order of 100,000 kilowatts. The valve converters are usually of the mercury vapour type connected in three-phase bridge arrangement, both at the rectifying end and also at the inverting end. Thus each set comprises three pairs of converters connected anode to cathode, one pair for each transformer phase.

In general, a two-conductor line with the mid-point earthed is employed, so that there is one set of six converters between one conductor and the earthed point, and a further set between the earthed point and the other conductor. Each set is fed from a three-phase transformer with each phase of the secondary winding connected to the interconnected anode and cathode of one pair of converters.

The method of interrupting the direct current supply to the line by grid blocking of the rectifier valves rather than by tripping the circuit breaker on the alternating current side affords a very efficient means of protection. The usual arrangement of such grid blocking is initiated by over-current in the line as is usual in the protection of alternating current transmission systems. Since it is usual for other reasons to include smoothing coils in the line and to provide for a fairly high degree of compounding of the characteristics of the rectifiers, it may happen either that the protective apparatus does not respond at all or that it responds very late.

A good protection system for direct current transmission line includes some means on the inverter which act on the inverter side on the occurrence of faults on that side without the necessity of the rectifier interrupting the service, and, therefore, the protection at the rectifier and should be able to distinguish between faults in the inverter and faults on the line. The faults on the inverter side should in most cases be dealt with by the inverter itself. The faults on the line, however, cannot be handled by the inverter and, in order to keep the damage at the site of the fault as small as possible, faults on the line should be corrected as quickly as possible.

The usual protection initiated by over-current does not fulfil these requirements, and the object of the present invention is to provide a protection system of the rectifier which is quick acting and can discriminate between line faults and inverter faults.

In the case of an inverter fault, the line voltage at the rectifier end of the line falls away in a smooth curve, and during the same interval, the current in the line rises along a similar curve, that is to say, it increases slowly at first and then more rapidly along a curve which is concave upwardly. The reason for the initial slow increase of the line current is due to the presence of the smoothing inductor at the inverter end. However, in the case of a line fault the voltage at the rectifier end of the line drops away almost instantaneously and the current in the line rises very abruptly at first and then more slowly along a curve which is convex upwardly. The present invention is based on the difference between these two kinds of results and grid blocking should be applied to the rectifier immediately in the case of a line fault, but not, or at least not immediately, in the case of an inverter fault.

In order to achieve this result, according to the present invention, a protective device is employed which responds to a high rate of rise of the line current to effect grid blocking at the rectifier. The high rate of rise of current occurs immediately in the event of a line fault, but in the case of an inverter fault, particularly when there is some compounding of the rectifier characteristics, the rate of rise of current only reaches the necessary value after a definite time interval and often not at all. Thus the protective device responds so as to give quick action on the occurrence of a line fault and to give no action or no immediate action in the case of an inverter fault.

A voltage proportional to the rate of rise of the line current is available across the smoothing inductor at the rectifier end and this voltage may be used to energise a relay to operate the protective device. In practice, the voltage used is that induced in an additional winding on the core of the smoothing inductor or that induced in the secondary winding of a voltage transformer having its primary winding connected across the inductor. In order that the ripple component in the voltage normally present may have no effect, some small electrical inertia may be introduced by including series resistance and shunt capacity in the connections from the source of voltage employed to the relay operated by that voltage. Any usual form of relay may be employed, such as an electro-magnetic relay or a gas discharge relay.

Faults leading to the operation of the protective device usually clear themselves in a relatively short time and it is, therefore, desirable to return the system to its normal operating condition after this time interval. This may be achieved by the use of a timing relay which operates after a definite time interval to interrupt the grid blocking and allow the normal grid impulses to restart. This time interval should be somewhat longer than the normal time for clearing the fault.

If at the end of the time interval when the grid impulses are restored, the fault still exists, a voltage will still be present across the smoothing inductor and the protective device will again be operated, being de-energised once again by the timing relay. This cycle may occur several times and since such hunting is undesirable, an anti-hunting relay may be provided, which after a predetermined number of operations of the protective device comes into action to prevent further operation.

An installation in accordance with the invention is illustrated by way of example in the accompanying drawings, in which.

Figure 1:
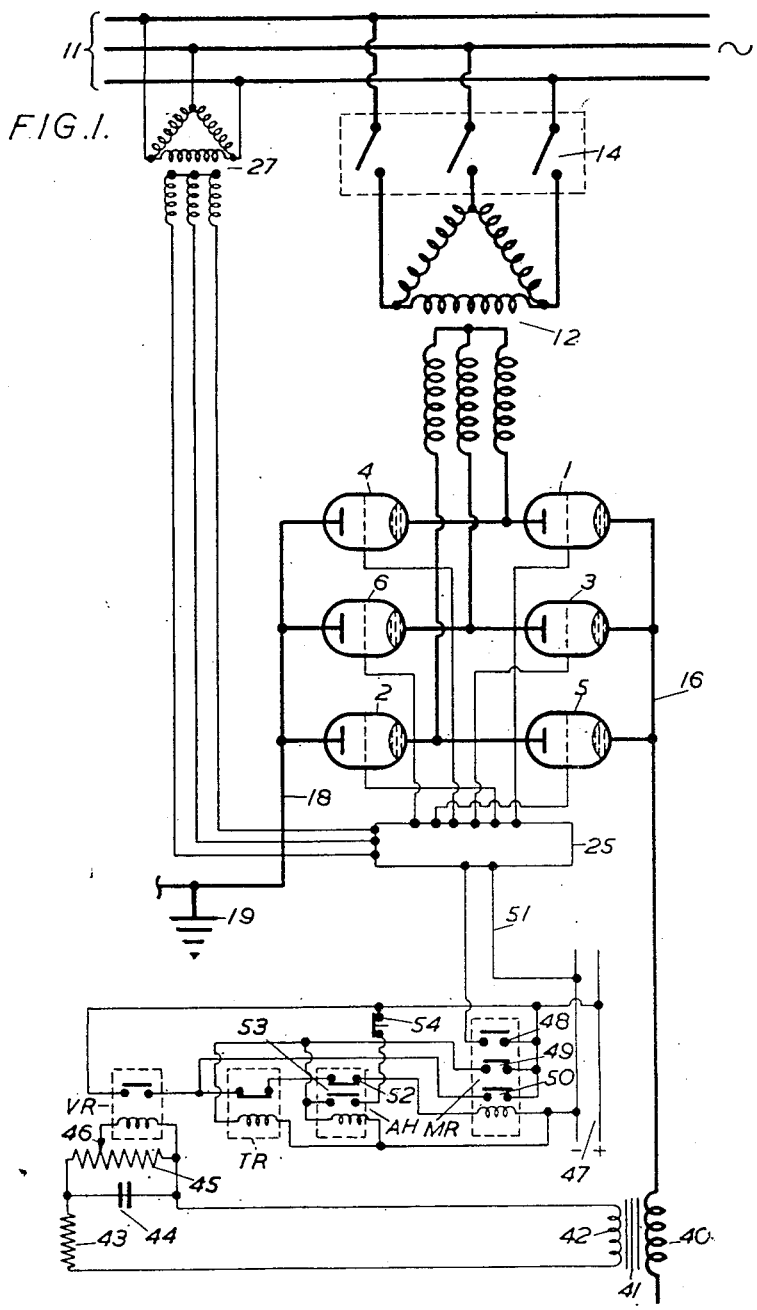
Figure 1 shows a complete rectifier installation.

As shown in Figure 1 the supply is taken from three-phase alternating current mains 11 to a transformer 12, the primary windings of which are connected in delta and the secondary windings in star. A circuit breaker 14 is provided to isolate the transformer from the mains 11. Each phase of the secondary winding of the transformer is connected to the mid-point between pairs of mercury vapour converters 1 and 4, 3 and 6 and 5 and 2. The converters of each pair are connected anode to cathode between an intermediate point constituted by a busbar 18 earthed at 19 and a positive line conductor 16. The whole equipment is duplicated between the negative line conductor and the intermediate point by the provision of a second transformer and a second set of six converters, and since this half is identical with that shown, it is not illustrated.

The grids of the converters have timed impulses applied to them in the usual manner by means of a control unit shown diagrammatically at 25 and energised by way of an auxiliary transformer 27 from the mains 11. These impulses are applied to the grids in the sequence of their reference numerals so that converter 1 fires first, followed at an interval of sixty electrical degrees of the alternating current cycle by converter 2 and then by converter 3 and so forth.

A line conductor 16 is provided with a smoothing inductor 40, the core 41 of which has a second winding 42. A fault in the line will cause a sudden rise of current in the manner already described, inducing a voltage across the smoothing inductor 40 and hence also across the winding 42. The normal ripple is largely eliminated by the inclusion of a series resistance 43 and a shunt capacity 44 in the manner already described, and an operating voltage is then tapped off from a potentiometer resistance 45 by way of a tap 46. This voltage is applied to the coil of a relay VR, serving to close its contacts, which are normally open. This completes a circuit from direct current mains 47 through normally closed contacts of two further relays TR and AH to the coil of a main relay MR. This relay has three pairs of contacts 48, 49 and 50, all of which are normally open and which are closed when the coil is energised by the closing of the contacts of the relay VR.

Closing of the contacts 48 completes a circuit from the positive direct current line to the controller 25, a negative return lead 51 being provided. This operates the protective device and provides the necessary grid blocking of the converters 1 to 6. Closing of the contacts 50 completes a holding circuit to the coil of the relay MR, which passes through the normally closed contacts of the relays TR and AH so that the relay MR is kept energised even if relay VR opens its contacts.

Closing of the contacts 49 completes a circuit through the coil of the timing relay TR and also through the coil of the anti-hunting relay AH. The relay TR is set with a time delay so that after its coil has been energised for a predetermined time interval, its normally closed contacts open. This interrupts the circuit to the coil of the relay MR and opens contacts 48, 49 and 50, thus allowing the normal grid impulses to restart and also de-energising the relay TR to close its contacts again.

If there is still sufficient voltage across the smoothing inductor 40, the relay MR will then be re-energised and the sequence of operations will then be repeated. This may occur a number of times, and since a continuance of this hunting is undesirable, the anti-hunting relay AH is designed to come into operation after its coil has been energised for a predetermined time interval corresponding to a number of operations of the relay MR. When the relay AH operates, it opens its normally closed contacts 52 so as again to interrupt the circuit to the coil of the relay MR, and at the same time closes a normally open pair of contacts 53. These complete a holding circuit to the relay coil by way of a push-button 54. The relay AH is thus left in the energised condition so that the relay MR cannot be re-energised and the protective device is thus put out of action until it is restored by manual operation of the push-button 54.

Figure 2:
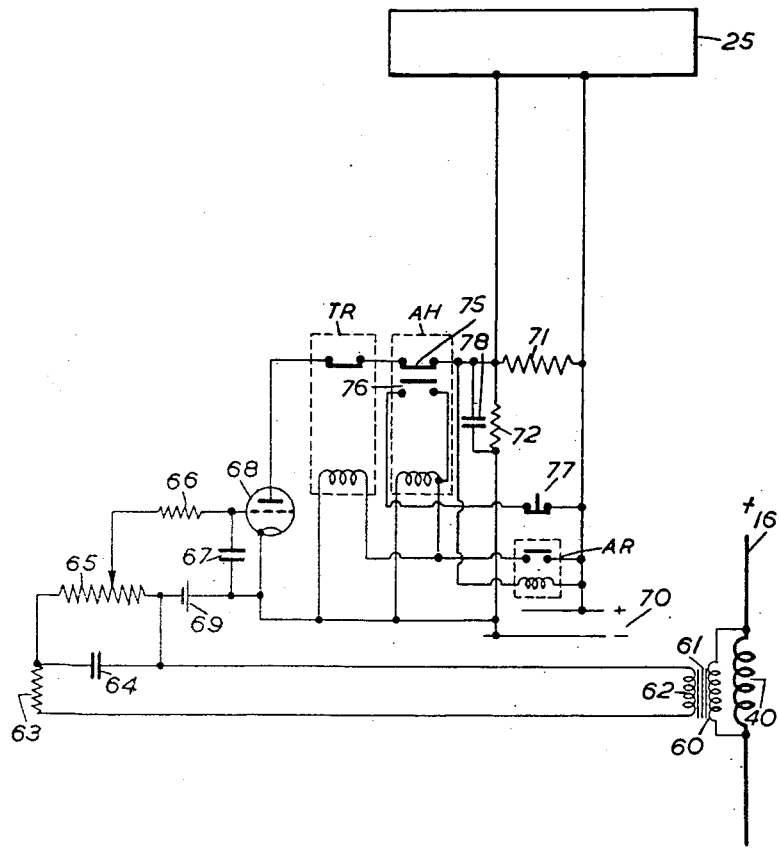
Figure 2 shows a modified form of protective arrangement.

In the modified circuit arrangement shown in Figure 2, the smoothing inductor 40 has the primary winding 60 of a voltage transformer 61 connected across its terminals. The secondary winding 62 is provided with a series resistance 63 and shunt capacity 64 in the same manner as shown in Figure 1. The operating voltage is tapped off from a potentiometer resistance 65, across which a resistance 66 is connected in series with a capacity 67, the mid-point between these being connected to the grid of a gas-filled triode 68. Grid bias is provided by means of a battery 69 and when sufficient voltage appears across the smoothing inductor 40, the anode circuit of the valve 68 is rendered conductive.

The anode circuit is supplied from direct current lines 70 and includes normally closed contacts of a timing relay TR, normally closed conance 71. The resistance 71 is also connected in series with a resistance 72 across the direct current lines so that when the triode 68 is rendered conductive, the resistance 72 is shunted. The voltage drop across the resistance 71 is thereby immediately raised and this raised voltage is applied to the controller 25.

In one common system for supplying grid impulses to the valve converters, the energy for the successive impulses is obtained from a condenser which is charged through a charging valve in timed relationship with the phase of the alternating current. The condenser is discharged through a discharge valve and the discharge impulse is transmitted via a transformer to the converter in question. The discharge valve is itself grid-controlled to time the grid impulses to the converter, and the increased voltage across the resistance 71 is applied in a negative sense to the grid of this valve so as to prevent it firing and thus provide grid blocking of the main converter.

The increased voltage across the resistance 71 also energises the coil of an auxiliary relay AR which is so designed as not to be actuated by the normal voltage existing across the resistance 71. As soon as the auxiliary relay AR closes its contacts, this energises the coils of both the relays TR and AH which function in the same manner as the corresponding relays shown in Figure 1. Thus after a predetermined interval, the relay TR opens its contacts to interrupt the anode circuit of the valve 68 and thus stop grid blocking of the valve converters. Similarly after a number of operations of the relay TR, the relay AH opens one pair of contacts 75 to interrupt the grid blocking and closes a second pair of contacts 76, which complete a holding circuit to its coil by way of a push-button 77. Thus the protective device is put out of action until manually restored by operation of this push-button.

A condenser 78 is connected in parallel with the resistance 72. When the anode circuit of the valve 68 is interrupted, charging of this condenser delays the immediate drop of voltage across the resistance 71, so that the restoration of the grid impulses to the valve converters proceeds gradually.

I claim:
1. In a rectifying installation for a high voltage direct current electric power transmission system, the combination of a three phase alternating current supply, a three phase power transformer having its primary winding connected to said alternating current supply, a pair of direct current terminals, three pairs of grid-controlled mercury vapour current converters connected anode to cathode between said terminals, the phase connections of the secondary winding of said transformer being connected between the mid-points of said pairs of current converters, grid control means for said converters, a line conductor connected to one of said terminals, a smoothing inductor connected in said line conductor, means responsive to voltage across said smoothing inductor, a relay operated by said voltage responsive means, circuit means completed by said relay for blocking impulses to the grids of said converters, a timing relay operative to interrupt said circuit means after a predetermined interval, an anti-hunting relay operative to interrupt said circuit means after repeated operation of said first relay, a holding circuit for said anti-hunting relay energized by operation of said anti-hunting relay, and push-button means connected in said holding circuit for manual interruption of said holding circuit.

2. A rectifying installation according to claim 1, and including means for providing delayed interruption of said circuit means.

FELIX BUSEMANN.

References Cited in the file of this patent
UNITED STATES PATENTS

| Number | Name | Date |
|---|---|---|
| 2,004,952 | Journeaux | June 18, 1935 |
| 2,026,358 | Petersen | Dec. 31, 1935 |
| 2,056,655 | Ehrensperger | Oct. 6, 1936 |
| 2,175,020 | Frohmer | Oct. 3, 1939 |
| 2,568,391 | Geiselman | Sept. 18, 1951 |